(12) United States Patent
Machado et al.

(10) Patent No.: US 7,296,768 B2
(45) Date of Patent: Nov. 20, 2007

(54) STRUCTURE FOR MOUNTING A TURBOPROP UNDER AN AIRCRAFT WING

(75) Inventors: Stephane Machado, Villeneuve-Tolosane (FR); Jerome Cassagne, Toulouse (FR); Anthony Del Blanco, Toulouse (FR); Yvon Martin, Bonrepos Riquet (FR); Arnaud Chambreuil, Labastide Saint Sernin (FR)

(73) Assignee: Airbus France, Toulouse (FR)

( * ) Notice: Subject to any disclaimer, the term of this patent is extended or adjusted under 35 U.S.C. 154(b) by 446 days.

(21) Appl. No.: 10/986,870

(22) Filed: Nov. 15, 2004

(65) Prior Publication Data

US 2005/0178889 A1 Aug. 18, 2005

(30) Foreign Application Priority Data

Dec. 1, 2003 (FR) ................................. 03 50948

(51) Int. Cl.
*B64D 27/26* (2006.01)

(52) U.S. Cl. ......................................... 244/54; 60/797
(58) Field of Classification Search .............. 244/53 R, 244/54, 55; 60/797, 798; 248/554
See application file for complete search history.

(56) References Cited

U.S. PATENT DOCUMENTS

| 4,037,809 | A |  | 7/1977 | Legrand |
| 5,065,959 | A | * | 11/1991 | Bhatia et al. .................. 244/54 |
| 5,409,184 | A |  | 4/1995 | Udall et al. |
| 5,806,792 | A | * | 9/1998 | Brossier et al. ................ 244/54 |
| 5,871,177 | A | * | 2/1999 | Demouzon et al. ........... 244/54 |
| 6,126,110 | A |  | 10/2000 | Seaquist et al. |

FOREIGN PATENT DOCUMENTS

FR 2 291 091 6/1976

* cited by examiner

*Primary Examiner*—Rob Swiatek
(74) *Attorney, Agent, or Firm*—Oblon, Spivak, McClelland, Maier & Neustadt, P.C.

(57) ABSTRACT

A structure for mounting a turboprop under an aircraft wing includes a rigid structure and a device for fastening the turboprop on the rigid structure. The rigid structure is composed of a box, and the device for fastening includes at least two lateral connecting rods resisting the engine torque generated by the turboprop, the connecting rods being arranged on each side of the box and each having a forward end connected to a gear box of the turboprop, and an aft end connected to the box.

9 Claims, 1 Drawing Sheet

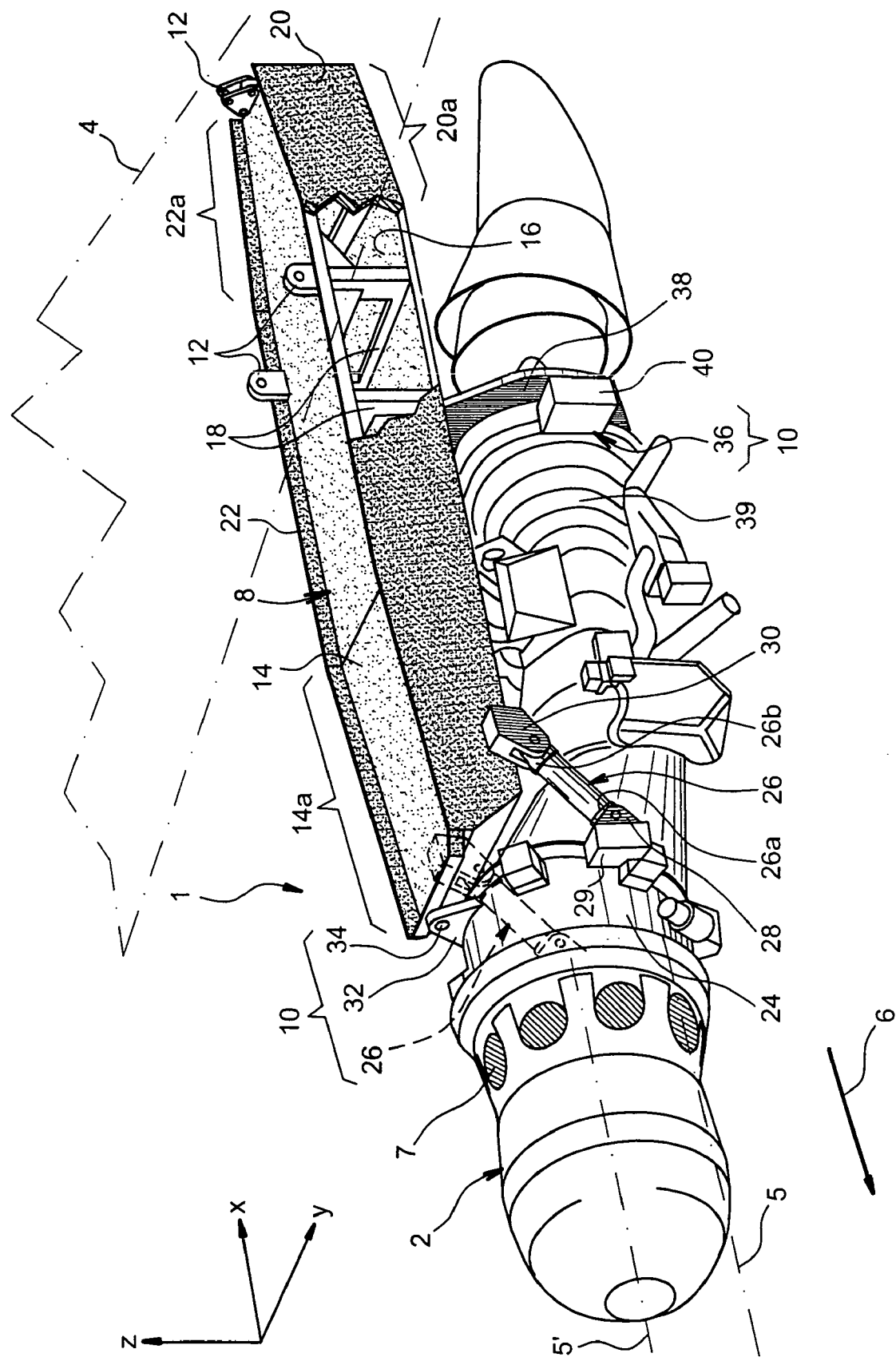

STRUCTURE FOR MOUNTING A TURBOPROP UNDER AN AIRCRAFT WING

TECHNICAL DOMAIN

This invention relates to a structure for mounting or suspending a turboprop under an aircraft wing.

This type of structure may be used on any type of aircraft comprising turboprops suspended under its wing. In this respect, it is particularly suitable for use on aircraft fitted with turboprops capable of outputting high power, more than 10000 horsepower.

STATE OF THE PRIOR ART

On existing aircraft, engines are suspended under or are mounted above the wing by complex Engine Mounting Structures (EMS).

These structures are designed particularly to transmit static and dynamic forces generated by engines, such as weight, thrust or different dynamic forces, to the wing.

In the special case of a turboprop, three main criteria are taken into account to design the associated mounting structure, namely resistance to engine torque, the mass of this structure and finally the limitation to the displacement of the turboprop nozzle relative to the mounting structure.

In prior art, a turboprop is conventionally suspended under an aircraft wing by using a mounting structure comprising a rigid structure provided with an aft under-wing box, and one or several rigid segments arranged in sequence forwards along the longitudinal direction of the engine. As an illustrative example, in this type of so-called statically indeterminate solution, the structure can include two rigid forward segments.

In this configuration, each rigid forward segment has two transverse frames at a spacing from each other, and connected to each other by a plurality of connecting rods, which then jointly form a so-called "lattice structure" with the transverse frames.

This solution is satisfactory for a mounting structure designed to suspend a turboprop within a normal power range, particularly due to its ability to resist the engine torque generated during operation of the associated turboprop.

Nevertheless, recent aircraft development has lead particularly to the use of extremely high power turboprops compared with power values encountered in the past, these power values possibly being more than 10000 horsepower or even more than 13000 horsepower.

Studies carried out showed that considering technological feasibility limits for connecting rods for a conventional lattice type structure, this type of structure cannot resist the entire engine torque generated for power values which can be more than 230000 N.m.

OBJECTS OF THE INVENTION

Therefore, the purpose of the invention is to propose a turboprop mounting structure under an aircraft wing, this structure at least partially correcting the disadvantages mentioned above related to structures according to prior art.

In particular, the purpose of the invention is to present a mounting structure for a high power turboprop capable of satisfying requirements related to resistance of the engine torque generated during operation of the turboprop, and the mass of this structure and limitation of the displacement of the nozzle of this turboprop relative to the mounting structure.

To achieve this, the object of the invention is a turboprop mounting structure under an aircraft wing, said structure comprising a rigid structure and means of fastening the turboprop onto this rigid structure. According to the invention, the rigid structure is composed of a box, and mounting means comprise at least two lateral connecting rods resisting the engine torque generated by the turboprop, these connecting rods being arranged on each side of a box and each having a forward end connected to a turboprop gear box, and an aft end connected to the box.

Advantageously, it has been observed that the original association between lateral engine torque resistance connecting rods and a box, for example of a type similar to the type used in turbojet mounting structures, could be used to relatively easily resist the engine torque generated by a high power turboprop, for example with a power of more than 13000 hp, unlike previously proposed solutions with a lattice structure.

Moreover, the mounting structure according to the invention is advantageous in the sense that its design also enables it to satisfy mass and displacement limitation criteria for the engine nozzle.

Moreover, studies have shown that the particular arrangement proposed by the invention enables resistance of the entire engine torque, mainly by the box forming the rigid structure of the mounting structure, although after this torque has entirely passed through the thrust resistance rods provided for this purpose.

In this context, it is noted that one advantage of this specific feature lies in the fact that no part of the engine torque has to be resisted at the turboprop engine casing, to the extent that the forward end of the thrust resistance rods is connected to the gear box of this turboprop.

Finally, it is noted that the design of the mounting structure according to the invention, and more particularly the design of the rigid box-shaped structure also called the "pylon" is fully adapted to enable vertical placement of the turboprop on this structure. For guidance, this placement can then be achieved by installing the turboprop from underneath, and bringing it vertically up into position as far as the mounting structure which is held fixed.

According to one preferred embodiment of this invention, the mounting means comprise only two lateral rods to resist the engine torque generated by the turboprop. Naturally, these lateral connecting rods have the main function of resisting the engine torque, therefore they are preferably arranged symmetrically about a vertical plane passing through the longitudinal axis of the turboprop.

Furthermore, the fact of providing only one side/lateral connecting rod on each side of the box enables satisfactory access to the turboprop, particularly in order to mount conventional equipment onto it. It is noted that this access is particularly important because the aft end of each of the lateral connecting rods can be connected to a forward part of the box itself located above the turboprop, thus leaving two lateral spaces practically entirely free to enable access to the turboprop.

Preferably, the mounting means comprise assembly means inserted between the forward end of the connecting rod and the turboprop gear box, for each engine torque resistance lateral connecting rod. The assembly means are then preferably arranged so that a horizontal median plane of a propeller of the turboprop passes through them, through a longitudinal axis of the propeller.

This particular configuration enables the lateral connecting rods to resist the engine torque very satisfactorily, in that the forces are resisted through the longitudinal axis of the propulsion propeller, within or close to the fictitious horizontal median plane mentioned above.

The specific arrangement of the forward ends of the lateral connecting rods that has just been mentioned is also advantageous, since these same connecting rods are also provided to resist the thrust generated by the turboprop.

In this case, it would be possible for the lateral connecting rods resisting the engine torque to be positioned to come closer to a vertical plane passing through the longitudinal axis of the turboprop, extending simultaneously upwards and towards the aft direction. For example, it is noted that these lateral connecting rods are then capable of resisting forces applied mainly along a vertical direction oriented radially from the turboprop towards the mounting structure, along a transverse direction with respect to the turboprop, and along a longitudinal direction with respect to this turboprop.

Conventionally, the mounting means comprise preferably a forward fastener and an aft fastener, in addition to the lateral connecting rods.

It is then possible to design these fasteners such that the forward fastener is capable of resisting forces applied mainly along the vertical direction, oriented radially from the turboprop to the mounting structure, and along the transverse direction of the same turboprop, and such that the aft fastener is capable of resisting forces applied mainly along the vertical direction.

Finally, the box forming the rigid structure preferably comprises a lower stringer, an upper stringer, two side plates, and a plurality of inner transverse ribs connecting the stringers and the side plates. Obviously, the stringers and the side plates can each be replaced by a plurality of distinct elements connected to each other without departing from the scope of the invention.

Another object of the invention is an engine assembly comprising a turboprop and a mounting structure like that just described above.

Other advantages and special features of the invention will become clearer in the non-limitative detailed description given below.

BRIEF DESCRIPTION OF THE FIGURES

This description will be made with reference to the single FIGURE representing a partial perspective view of a mounting structure for a turboprop according to a preferred embodiment of this invention.

DETAILED DESCRIPTION OF PREFERRED EMBODIMENTS

The single FIGURE shows a mounting structure 1 according to a first preferred embodiment of this invention, this structure 1 being designed to suspend a turboprop 2 under an aircraft wing shown only diagrammatically for obvious reasons of clarity, and generally denoted by the numeric reference 4.

Throughout the following description, by convention, X is the direction parallel to a longitudinal axis 5 of the turboprop 2, Y is the transverse direction relative to the aircraft, and Z is the vertical direction or the direction radially outwards from the turboprop 2 towards the mounting structure 1, these three directions being orthogonal to each other. It is noted that the longitudinal axis 5 of the turboprop 2 should be considered as being the longitudinal axis of the engine casing, and not the longitudinal axis of its propeller 7 (for which the blades are shown). The longitudinal axis of the propeller 7 is indicated by numeric reference 5' on the single FIGURE. It is noted also that the two longitudinal axes mentioned above (5 and 5'), one located above the other, are in the same vertical median plane (not shown) of the turboprop (2).

Secondly, the terms "forward" and "aft" should be considered with respect to a direction of progress of the aircraft as a result of the thrust applied by the turboprops 2, this direction being shown diagrammatically by the arrow 6.

In this single FIGURE, it can be seen that a rigid structure 8 of the mounting structure 1 has been shown, accompanied by mounting means 10 of the turboprop 2 on this rigid structure 8, and suspension means 12 of this same rigid structure 8 under the aircraft wing 4, these means 10 and 12 naturally belonging to the mounting structure 1. In this respect, the suspension means 12 of the rigid structure 8 under the wing 4 are chosen among conventional means known to those skilled in the art, and consequently no detailed description of them will be made.

Other components of this mounting structure 1 that are not shown, of the secondary structure type, segregate and hold the systems while supporting aerodynamic fairings, and are conventional components identical or similar to those encountered in prior art and known to those skilled in the art. Consequently, no detailed description of them will be made.

In this preferred embodiment of the present invention, the rigid structure 8 is in the form of a box extending from the aft towards the forward direction, approximately along the X direction.

The box 8 is then in the form of a pylon with a design similar to that observed for turbojet mounting pylons. In other words, this box 8 may comprise an upper stringer 14 and a lower stringer 16 each extending approximately along the X direction and approximately in the XY planes, these stringers 14 and 16 being connected to each other through several transverse ribs 18 at a spacing and arranged in the YZ planes. Nevertheless, as is shown in the single FIGURE, it would be possible for at least part of the stringers 14 and 16 to be in a plane slightly inclined from the XY planes. As an illustrative example, a forward part 14a of the upper stringer 14 is arranged so as to become slightly closer to the longitudinal axis 5 of the turboprop 2 extending in the forward direction.

Furthermore, it is noted that the transverse ribs 18 are each in the form of a rectangle.

Furthermore, the under-wing box 10 comprises two side plates 20 and 22 closing the box.

Once again, the side plates 20 and 22 each extend approximately along the X direction but approximately in the XZ planes. As is shown in the single FIGURE, it would be possible for at least part of the side plates 20 and 22 to be in a plane slightly inclined from the XZ planes. Still as an illustrative example, an aft part 20a of the side plate 20 is arranged so as to come slightly closer to the longitudinal axis 5 of the turboprop 2, extending in the aft direction. Naturally, this is also the case for an aft part 22a of the other side plate 22.

Furthermore, the side plates 20 and 22 are also fixed to the transverse ribs 18 located inside an approximately parallelepiped-shaped space formed by these same side plates 20, 22 and stringers 14, 16.

It is noted that this "narrowed" configuration on the aft side of the rigid structure 8 of the structure 1 is fairly similar to that used for the aft under-wing box, normally used for turboprop mounting structures according to prior art.

Thus, as can be seen in the single FIGURE, the box 8 which is generally in a parallelepiped shape, extends longitudinally along the X direction as far as a gear box 24 of the turboprop 2, just behind the propeller 7. It also extends transversely along the Y direction along a length shorter than a maximum transverse length of the turboprop, not including the blades.

If the suspension means 12 of the box 8 that extend upwards from the upper stringer 14, correspond to conventional means previously encountered, the mounting means 10 of the turboprop 2 onto the box 8 are specific to the present invention.

The mounting means 10 in this preferred embodiment comprise firstly two lateral connecting rods 26 resisting the engine torque generated by the turboprop 2, the number of these connecting rods 26 obviously not being limitative in any way.

The two connecting rods 26 are arranged symmetrically about the vertical plane passing through the longitudinal axes 5 and 5' of the turboprop 2. Consequently, a single connecting rod 26 on each side of the rigid structure 8 of the structure 1 resists the engine torque, and transmits it entirely to the box 8.

In this respect and more generally, the entire rigid structure 8 and the mounting means 10 of the structure 1 that is designed such that the vertical plane passing through the longitudinal axis 5 delimits two identical parts symmetric about this vertical plane.

On each side of the box 8, the connecting rod 26 comprises one forward end 26a connected to the gear box 24 of the turboprop 2 through assembly means 28.

These assembly means 28, preferably composed of a single fitting, are more precisely mounted fixed to and outside the casing of the gear box 24. Furthermore, they are arranged so that a fictitious horizontal median plane (not shown) of the turboprop 2 passing through the longitudinal axis 5' of the propulsion propeller 7, passes through them, this axis 7 also corresponding to a longitudinal axis of the gear box 24. In other words, the two fittings 28 (only one of them being referenced in the single FIGURE for reasons of clarity) are positioned so as to be approximately diametrically opposite each other, on the casing of the gear box 24, which may be provided with supports 29 that project in the radial direction outwards in a YZ plane, so that they can be fitted with the assembly means 28.

The forward end 26a of the lateral connecting rod 26 resisting the engine torque may then be indifferently articulated on the fitting 28 or embedded into it.

Furthermore, from this forward end 26a, the connecting rod 26 extends simultaneously in the aft direction and upwards, coming closer to the vertical plane passing through the longitudinal axis 5, this plane naturally being a fictitious plane. It is noted for guidance that "upwards" means along the Z vertical direction, from the turboprop 2 towards the box 8.

The lateral connecting rod 26 resisting the thrust then extends as far as an aft end 26b connected to secondary assembly means 30 fixed to the box 8.

In the same way as the assembly means 28, the secondary assembly means 30 may be in the form of a simple fitting, on which the aft end 26b is articulated or embedded.

As can be seen in the single FIGURE, the fitting 30 is preferably mounted on a lower part of the side plate 20, 22, therefore close to or along the extension of the lower stringer 16 of the box 8. Furthermore, this fitting 30 is fixed to the side plate 20, 22 at the forward part of the box 8, and preferably in a part corresponding to the first eighth of this box 8, starting from the front and in the longitudinal direction X. Nevertheless, this fitting 30 may be in any other position, and depends on the angle required for the connecting rod 26 to respect a thrust/torque ratio that passes through this connecting rod 26.

The mounting means 10 also comprise a forward fastener 32 in the form of a fitting extending upwards along a YZ plane from an upper portion of the gearbox casing 24, as can be clearly seen in the single FIGURE. Furthermore, a pin 34 fixed at a forward end to the box 8, passes through this fitting 32 and preferably aligned with the upper stringer 14.

Finally, the mounting means 10 also comprise an aft fastener 36 which preferably has a fitting 38 in the shape of a half-ring located in a YZ plane, partially surrounding an aft end of an engine casing 39 of the turboprop 2. The fitting 38 in the shape of a half-ring is preferably mounted fixed under the lower stringer 16 of the box 8, projecting downwards from it.

The half-ring is approximately centred on the longitudinal axis 5 of the turboprop 2, this axis 5 therefore also corresponding to the longitudinal axis of the engine casing 39. The two ends of this half-ring are fixed to supports 40 fixed to the casing 39, and project from it radially outwards in a YZ plane. More precisely, these two supports 40 located on each side of the engine casing 39 of the turboprop 2 (only one of them being visible in the single FIGURE), are passed through by a fictitious horizontal plane passing through the longitudinal axis 5 of this engine casing 39, and are therefore diametrically opposite each other on this fictitious plane.

Consequently, with this arrangement, the forward fastener 34 can resist forces applied mainly along the Z vertical direction, and along a Y transverse direction, but not adapted to resist forces applied mainly along the X longitudinal direction.

On the other hand, the aft fastener 36 is designed only to resist forces applied mainly along the vertical direction Z, while the side rods 26 resisting the engine torque are capable of resisting forces applied mainly along the three directions X, Y and Z.

Obviously, those skilled in the art could make various modifications to the mounting structure 1 that has been described above as a non-limitative example only.

In this respect, note that those skilled in the art could couple anti-vibration systems with elements 28, 30, 34 and 40 described above.

The invention claimed is:

1. A turboprop mounting structure for mounting a turboprop under an aircraft wing, said structure comprising a rigid structure and mounting means for fastening the turboprop on said rigid structure, wherein said rigid structure includes a box, and the mounting means comprise at least two lateral connecting rods resisting the engine torque generated by said turboprop, said connecting rods being arranged on each side of the box and each having a forward end connected to a gear box of said turboprop, and an aft end connected to said box, wherein said mounting means comprise only two lateral connecting rods.

2. The turboprop mounting structure according to claim 1, wherein said mounting means comprise assembly means inserted between the forward end of said connecting rod and the gearbox of the turboprop, for each engine torque resistance lateral connecting rod, said assembly means being arranged so that a horizontal median plane of a propeller of the turboprop passes through them, through a longitudinal axis of the propeller.

3. The turboprop mounting structure according to claim 1, wherein said lateral connecting rods resisting the engine torque are positioned to come closer to a vertical plane passing through the longitudinal axis of the turboprop, extending simultaneously upwards and towards the aft direction.

4. The turboprop mounting structure according to claim 1, wherein said mounting means also comprise a forward fastener and an aft fastener.

5. The turboprop mounting structure according to claim 4, wherein the forward fastener is capable of resisting forces applied mainly along a vertical direction Z, oriented radially from the turboprop to the mounting structure, and along a transverse direction Y of the same turboprop.

6. The turboprop mounting structure according to claim 5, wherein the aft fastener is capable of resisting forces applied mainly along the vertical direction Z oriented radially from the turboprop to the mounting structure.

7. The turboprop mounting structure according to claim 6, wherein said lateral connecting rods resisting the engine torque are capable of resisting forces applied mainly along the vertical direction Z oriented radially from the turboprop towards the mounting structure, along the transverse direction Y with respect to the turboprop, and along a longitudinal direction X with respect to this turboprop.

8. The turboprop mounting structure according to claim 1, wherein said box comprises a lower stringer, an upper stringer, two side plates, and a plurality of inner transverse ribs connecting said stringers and said side plates.

9. An engine assembly for an aircraft comprising a turboprop equipped with a mounting structure according to any one of claims 1, 2-8.

* * * * *